United States Patent
Barber et al.

(10) Patent No.: US 9,262,932 B1
(45) Date of Patent: Feb. 16, 2016

(54) EXTENDED RUNWAY CENTERLINE SYSTEMS AND METHODS

(71) Applicants: Sarah Barber, Robins, IA (US); Christopher A. Scherer, Cedar Rapids, IA (US); Travis S. VanDerKamp, Marion, IA (US); Victor E. VIllagomez, Cedar Rapids, IA (US)

(72) Inventors: Sarah Barber, Robins, IA (US); Christopher A. Scherer, Cedar Rapids, IA (US); Travis S. VanDerKamp, Marion, IA (US); Victor E. VIllagomez, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 180 days.

(21) Appl. No.: 13/857,955

(22) Filed: Apr. 5, 2013

(51) Int. Cl.
*G08G 5/02* (2006.01)

(52) U.S. Cl.
CPC ........................................ *G08G 5/02* (2013.01)

(58) Field of Classification Search
CPC ..... G08G 5/025; G08G 5/065; G08G 5/0021; G08G 5/0013; G08G 5/0086; G08G 5/0078; G08G 5/0008; G08G 5/0026; G08G 5/0043; G08G 5/0065; G08G 5/02; G08G 5/06; G08G 5/0052; G08G 5/0082; G08G 5/045
USPC ........... 701/16, 120, 3, 301, 14, 457, 10, 117; 701/532; 340/972, 945, 979, 980, 953, 471; 342/30, 34, 35, 175, 118
See application file for complete search history.

(56) References Cited

U.S. PATENT DOCUMENTS

| | | | | |
|---|---|---|---|---|
| 3,521,228 A | * | 7/1970 | Izumi et al. | 340/973 |
| 3,999,007 A | * | 12/1976 | Crane | 348/123 |
| 4,276,029 A | * | 6/1981 | Gilson et al. | 434/43 |
| 5,374,932 A | * | 12/1994 | Wyschogrod et al. | 342/36 |
| 5,519,618 A | * | 5/1996 | Kastner et al. | 701/120 |
| 5,677,685 A | * | 10/1997 | Coirier et al. | 340/979 |
| 6,178,363 B1 | * | 1/2001 | McIntyre et al. | 701/16 |
| 6,195,609 B1 | * | 2/2001 | Pilley et al. | 701/120 |
| 7,295,901 B1 | | 11/2007 | Little et al. | |
| 7,555,372 B2 | * | 6/2009 | Dwyer | 701/16 |
| 7,908,077 B2 | * | 3/2011 | Smith et al. | 701/120 |
| 8,120,548 B1 | * | 2/2012 | Barber | 345/7 |
| 8,145,367 B2 | * | 3/2012 | Khatwa et al. | 701/16 |
| 8,175,799 B1 | * | 5/2012 | Woehler | 701/408 |
| 8,193,948 B1 | * | 6/2012 | Shapiro et al. | 340/965 |
| 8,234,058 B1 | * | 7/2012 | Barber et al. | 701/120 |
| 8,410,975 B1 | * | 4/2013 | Bell et al. | 342/120 |
| 8,462,019 B1 | * | 6/2013 | Vanderkamp et al. | 340/972 |
| 8,498,758 B1 | * | 7/2013 | Bell et al. | 701/4 |
| 8,504,223 B2 | * | 8/2013 | Boorman et al. | 701/14 |
| 8,659,471 B1 | * | 2/2014 | McCusker | 342/123 |
| 2004/0167685 A1 | * | 8/2004 | Ryan et al. | 701/16 |
| 2005/0015202 A1 | * | 1/2005 | Poe et al. | 701/301 |

(Continued)

OTHER PUBLICATIONS

Synthetic Vision System, en.wikipedia.org/wiki/Synthetic_vision_system, retrieved Feb. 28, 2013, 4 pages.

*Primary Examiner* — Truc M Do (74) *Attorney, Agent, or Firm* — Angel N. Gerdzhikov; Donna P. Suchy; Daniel M. Barbieri (57) ABSTRACT

Extended runway systems and methods include generating a runway centerline that extends from a start point on the runway to an endpoint located at a predefined distance from the start point. One or more distance markers are also calculated for the runway centerline. Display data is provided to an electronic display that causes the display to show the runway centerline and the one or more distance markers.

20 Claims, 6 Drawing Sheets

(56) References Cited

U.S. PATENT DOCUMENTS

| | | | |
|---|---|---|---|
| 2008/0300735 A1* | 12/2008 | He | 701/3 |
| 2008/0300741 A1* | 12/2008 | Constans | 701/16 |
| 2008/0312780 A1* | 12/2008 | Peed et al. | 701/9 |
| 2009/0150013 A1* | 6/2009 | Finn et al. | 701/11 |
| 2009/0326744 A1* | 12/2009 | He et al. | 701/10 |
| 2010/0026525 A1* | 2/2010 | Feyereisen et al. | 340/972 |
| 2010/0250030 A1* | 9/2010 | Nichols et al. | 701/7 |
| 2011/0166723 A1* | 7/2011 | Valentova et al. | 701/16 |
| 2011/0196598 A1* | 8/2011 | Feyereisen et al. | 701/120 |
| 2012/0265376 A1* | 10/2012 | Fleiger-Holmes et al. | 701/16 |

* cited by examiner

EXTENDED RUNWAY CENTERLINE SYSTEMS AND METHODS

BACKGROUND

The present disclosure relates generally to aircraft vision systems and methods. More particularly, the present application relates to aircraft vision systems and methods in which an extended runway centerline is depicted on an electronic display.

Aircraft pilots rely on situational awareness to avoid collisions with hazards, such as terrain, man-made structures, weather, and other aircraft. To facilitate the identification of potential hazards by a pilot and increase the situational awareness of the pilot, some aircraft are now equipped with synthetic vision systems. Synthetic vision systems generally operate by generating a three dimensional (3-D), virtual representation of the area in front of the aircraft. For example, a virtual representation of a mountain may be displayed by a synthetic vision system to represent a physical mountain located in front of the aircraft. The virtual representation may also correct for natural effects that would otherwise obscure the view of the pilot such as weather and nighttime conditions.

Despite the current advances in facilitating the situational awareness of a pilot regarding his or her surroundings, indicating the presence of an airport runway to a pilot remains challenging and difficult. In some cases, for example, a pilot making a descent into an airport may rely on lighting placed along a runway to determine the location and orientation of the runway relative to the aircraft. Applicants have discovered that there may be a need for aircraft vision systems and methods that enhance a pilot's detection of a runway by depicting an extended centerline of the runway that indicates a distance to the runway from the aircraft. Applicants have further discovered that there may be a need for visual techniques to represent a runway centerline regardless of whether the centerline would otherwise be obstructed by terrain, man made objects, or the like.

SUMMARY

One embodiment of the present disclosure relates to a method of providing an extended runway centerline to a display. The method includes determining, by processing electronics, a location of a runway relative to an aircraft. The method also includes generating a runway centerline based in part on the location of the runway relative to the aircraft. The runway centerline extends from a start point on the runway to an endpoint located at a predefined distance from the start point. The method further includes calculating one or more distance markers for the runway centerline, each distance marker corresponding to the distance from the start point to a point on the runway centerline. The method additionally includes providing display data to an electronic display, the display data being configured to cause the electronic display to show the generated runway centerline and one or more distance markers.

Another embodiment of the present disclosure relates to a system for providing an extended runway centerline to a display. The system includes processing electronics configured to determine a location of a runway relative to an aircraft. The processing electronics are also configured to generate a runway centerline based in part on the location of the runway relative to the aircraft, the runway centerline extending from a start point on the runway to an endpoint located at a predefined distance from the start point. The processing electronics are further configured to calculate one or more distance markers for the runway centerline, each distance marker corresponding to the distance from the start point to a point on the runway centerline. The processing electronics are also configured to provide display data to an electronic display, the display data being configured to cause the electronic display to show the generated runway centerline and the one or more distance markers.

A further embodiment of the present disclosure relates to a computer-readable storage medium having instructions stored therein, the instructions being executable by a processor to cause the processor to perform operations. The operations include determining a location of a runway relative to an aircraft. The operations also include generating a runway centerline based in part on the location of the runway relative to the aircraft, the runway centerline extending from a start point on the runway to an endpoint located at a predefined distance from the start point. The operations further include calculating one or more distance markers for the runway centerline, each distance marker corresponding to the distance from the start point to a point on the runway centerline. The operations additionally include providing display data to an electronic display, the display data being configured to cause the electronic display to show the generated runway centerline and the one or more distance markers.

BRIEF DESCRIPTION OF THE DRAWINGS

The invention will become more fully understood from the following detailed description, taken in conjunction with the accompanying drawings, wherein like reference numerals refer to like elements, in which.

Like reference numbers and designations in the various drawings indicate like elements.

DETAILED DESCRIPTION

Referring generally to the Figures, synthetic vision systems and methods are disclosed that depict an extended runway centerline on an electronic display. The display may be, for example, a head-up display (HUD) or a head-down (HDD) display. In general, a HUD is a form of electronic display situated within a pilot's normal field of view from the windshield of the aircraft. This differs from an HDD which requires the pilot to look down from the windshield to read the HDD. A synthetic or enhanced representation of the aircraft's surroundings may be provided to an HUD or HDD. For example, a synthetic vision system may use stored terrain data and/or received radar returns to create a 3-D representation of the terrain in front of the aircraft. According to various embodiments, an extended centerline for an airport runway may be depicted within the synthetic vision system. For example, a runway centerline may be depicted that extends from the runway out to ten nautical miles (NM). In some embodiments, distance indicators may be provided in conjunction with the centerline. For example, the centerline may include text, numbers, hash marks, or other indicia to denote distances at the 1 NM, 2 NM, 3 NM, 5 NM, and 10 NM marks from the runway. In further embodiments, a synthetic vision system may indicate whether any obstacles are located between the aircraft and an extended centerline. For example, the centerline may appear as a dashed line when occluded by terrain or other obstacles and as a solid line when not occluded.

Figure 1:
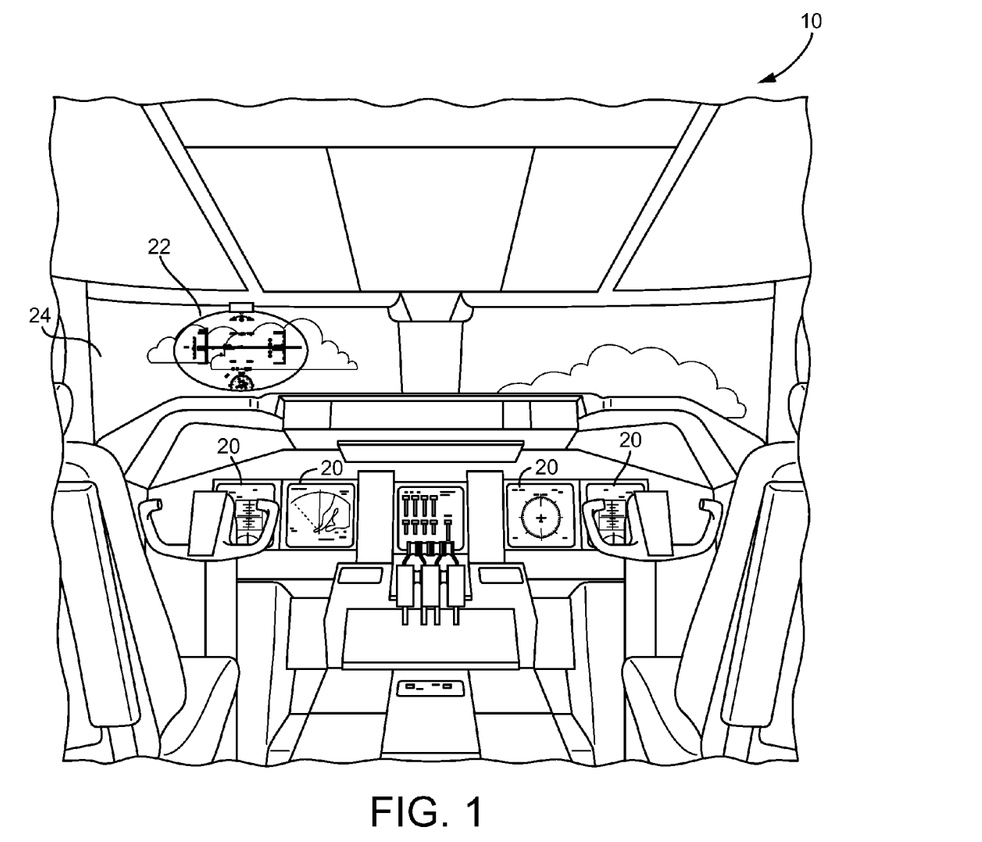
FIG. 1 is an illustration of an aircraft control center, according to an exemplary embodiment.

Referring now to FIG. 1, an illustration of an aircraft control center 10 is shown, according to an exemplary embodiment. Aircraft control center 10 may include various flight displays used by the aircraft's pilot to increase visual range and enhance the pilot's situational awareness. As shown, aircraft control center 10 includes flight displays 20 and a HUD 22. HUD 22 may be located within aircraft control center 10 such that HUD 22 is directly within the pilot's field of vision when looking through windshield 24 of the aircraft. In contrast, flight displays 20 may be located within aircraft control center 10 below the window line, requiring the pilot to look in a downward direction to view flight displays 20 (i.e., flight displays 20 may be HDDs). Flight displays 20 can include an enhanced vision or synthetic vision display system or HUD 22 can be configured for synthetic vision or enhanced vision displays.

In one embodiment, HUD 22 may be partially transparent, allowing the pilot to partially see through HUD 22 and windshield 24. For example, HUD 22 may display data that appears as an overlay to the pilot's field of view through HUD 22. Alternatively, the processing electronics may provide an enhanced view of the aircraft's exterior to HUD 22 (e.g., using data received from an infrared sensor) or a synthetic rendering of the exterior (e.g., as part of a synthetic vision system). In some embodiments, the processing electronics may be configured to allow the pilot to selectively switch between views. For example, a pilot may switch between a partially transparent view and a fully synthetic vision view on HUD 22. In further embodiments, any of the displayed data described herein with respect to HUD 22 may be provided by flight displays 20 in addition to, or in lieu of, HUD 22.

Processing electronics on board the aircraft may be configured to provide data regarding the state of the aircraft to flight displays 20 and/or HUD 22. For example, data regarding the aircraft's altitude, heading, velocity, etc., may be provided to flight displays 20 and/or HUD 22 by the processing electronics. The processing electronics may be further configured to provide data regarding the external surroundings of the aircraft to flight displays 20 and/or HUD 22. The data can be conformally represented in the real world scene on HUD 22 in one embodiment. In other words, data that appears on HUD 22 may be located precisely in the location of the corresponding feature of the plane's exterior (e.g., a line on HUD 22 may conform to the location of the horizon as the plane moves, etc.).

The processing electronics of the aircraft may receive data regarding the aircraft's surroundings from onboard sensors. For example, the aircraft may be equipped with a radar that performs vertical and horizontal radar sweeps in front of the aircraft. Radar returns may then be processed by the processing electronics to generate and provide display data to flight displays 20 and HUD 22 regarding the external surroundings of the aircraft. For example, flight displays 20 may provide a top-down view, a horizontal view, a vertical profile view, or any other view of weather, terrain, objects, and/or other aircraft detected by processing electronics onboard the aircraft.

The processing electronics of the aircraft may also receive data regarding the aircraft's surroundings communicated from an external source (e.g., a satellite, another aircraft, a ground-based communications station, etc.). In various embodiments, communication devices in the aircraft may be configured to receive and/or transmit data with the external sources. For example, the aircraft may request data regarding the location and bearing of nearby aircraft via the communication devices. The returned data may then be processed by the processing electronics and used to provide information regarding the other aircraft to the pilot via flight displays 20 and HUD 22.

A terrain database may be stored by the processing electronics and used to generate a synthetic view of the aircraft's surroundings. For example, a stored terrain database may include data regarding the shape, size, and location of terrain. In some embodiments, the terrain database may also include data regarding man-made structures, such as antennas, buildings, bridges, and the like. The terrain database may also include data regarding the layout and location of airports. For example, the database may include data regarding the location of an airport's runways, control tower, etc. In other embodiments, the terrain database may receive data regarding an airport from another database stored by the processing electronics, such as a chart database configured to store airport diagrams, approach charts, etc. In various embodiments, the processing electronics may use radar returns to enhance or supplant stored terrain data. For example, the processing electronics may use radar returns or other sensor data (e.g., data from an infrared camera, etc.) to display obstacles, terrain, or other hazards that are detected by the radar but do not appear in the terrain database. Such a system is described in U.S. patent application Ser. No. 12/236,464 filed on Sep. 23, 2008 and entitled, "System and Method for Verifying Displayed Terrain Information," the entirety of which is hereby incorporated by reference.

The processing electronics may generate a partially or fully virtual rendition of the aircraft's surroundings using the terrain database, radar returns, other sensor data, and data regarding the aircraft's altitude, bearing, and heading. For example, the processing electronics may generate a 3-D representation of the scenery in front of the aircraft and provide the representation to HUD 22 and/or to one of flight displays 20. The rendition may also include various indicia regarding the current state of the aircraft. For example, the rendering on HUD 22 or flight display 20 may include data regarding the aircraft's heading, course, altitude, or the like. In further embodiments, the rendering may include a warning generated by a traffic collision avoidance system (TCAS) or terrain awareness and avoidance system (TAWS) of the processing electronics.

An enhanced or fully virtual graphic provided to HUD 22 and/or flight displays 20 by the aircraft's processing electronics may include indicia to alert the pilot to the presence of an airport. In some embodiments, an airport and/or a particular runway may be highlighted on screen. For example, a hemispherical dome may be displayed over a detected airport or a highlighted perimeter displayed around a given runway. The indicia may be displayed by the processing electronics based on the distance between the aircraft and the runway or airport (e.g., when the aircraft is within a certain range of the airport) or using any number of other control parameters (e.g., in response to a request for such information from a pilot).

According to various embodiments, the processing electronics may generate a runway centerline graphic for display on HUD 22 and/or flight displays 20. Such a centerline may extend out from a runway and provide indicia regarding the distances to the runway. Thus, a pilot is not only alerted to the presence of the runway via HUD 22 and/or flight displays 20, but is also able to quickly assess the distance to the runway during an approach. Distance indicia may include, but is not limited to, hash marks along the centerline, text or numbers, or symbols that indicate the distances to the runway. In one embodiment, a displayed runway centerline may be presented on screen such that it bisects any present terrain. For example, the centerline may appear as a dashed line through a hill and as a sold line in the regions where it does not overlap with terrain.

Figure 2:
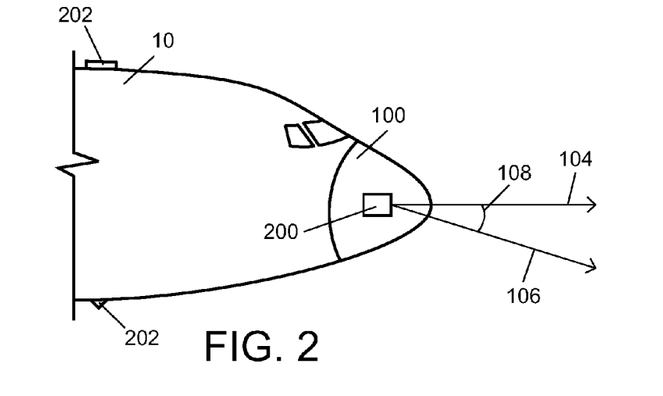
FIG. 2 is an illustration of the nose of an aircraft, according to an exemplary embodiment.

In FIG. 2, the front of an aircraft is shown with aircraft control center 10 and nose 100, according to an exemplary embodiment. Various sensory devices may be located along the exterior of the aircraft. In one embodiment, a radar system 200 (e.g., a weather radar system or other radar system) is generally located within nose 100 of the aircraft or within aircraft control center 10 of the aircraft. Radar system 200 generally works by sweeping a radar beam horizontally and/or vertically along the sky. For example, radar system 200 may conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display, such as a flight display 20 or HUD 22 in aircraft control center 10. Returns can also be processed to, for example, distinguish between terrain and weather, to determine the height of terrain, or to determine the height of weather. Similar to radar system 200, the aircraft may include other forms of sensors that receive data regarding the aircraft's surroundings, in further embodiments. Other forms of sensors (not shown) may include, but are not limited to, barometers, altimeters (e.g., radio altimeters, barometric altimeters, etc.), temperature sensors, accelerometers, attitude gyros, or video sensors (e.g., infrared cameras, cameras that operate in the visual spectrum, etc.).

Communication devices 202 may include devices configured to receive and/or transmit data between the aircraft and one or more external sources. For example, communication devices 202 may include antennas located along the top or bottom of the aircraft to communicate with other airborne or ground-based systems.

Communication devices 202 may also include communication electronics coupled to the antennas, such as receivers, transmitters, or transceivers. Communication devices 202 may include separate hardware to support different communication protocols and systems. For example, communication devices 202 may include a TCAS antenna and a separate antenna for receiving location data from a satellite-based positioning system (e.g., GPS, GLONASS, etc.). Communication devices 202 may also include shared hardware configured to communicate via multiple communication protocols.

Communication devices 202 may also receive data regarding the aircraft's surroundings. For example, communication devices 202 may receive data regarding another aircraft (e.g., range, altitude, bearing, etc.) or airport from a ground-based communications system, a satellite-based communications system, or from the other aircraft itself. The data may be received by communication devices 202 actively (e.g., in response to a request sent by communication devices 202) or passively (e.g., not in response to a request for the data). Communication devices 202 may also be configured to allow audio or video to be communicated between aircraft control center 10 and an external source. For example, communication devices 202 may transfer audio data between the aircraft's pilot and an air traffic controller or pilot of another aircraft via a radio channel.

Figure 3:
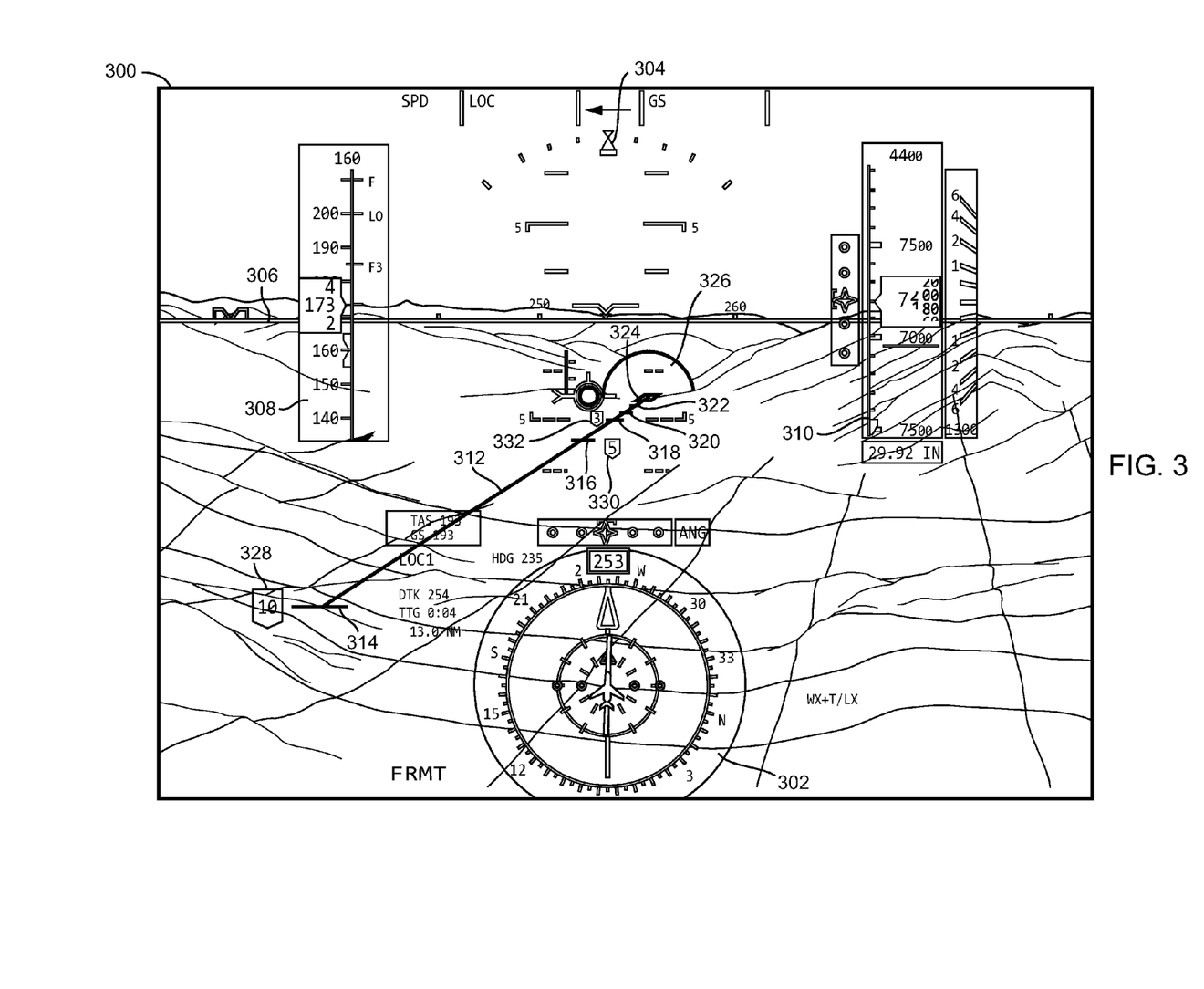
FIG. 3 is an illustration of an electronic display presenting an extended runway centerline, according to an exemplary embodiment.

Referring now to FIG. 3, an illustration is shown of an electronic display 300 presenting an extended runway centerline 312. In some embodiments, electronic display 300 may be a display located within an aircraft control center. For example, electronic display 300 may be HUD 22 or one of flight displays 20 in aircraft control center 10. Electronic display 300 may be in communication with on-board processing electronics that provide generated display data to display 300 for presentation to a pilot or other user. The display data may include a synthetic representation of the exterior of the aircraft or an overlay that appears on a transparent display (e.g., an augmented reality display). In another embodiment, the display data may include graphical indicia overlaid on a camera feed, such as a video stream from an infrared camera that captures video from the exterior of the aircraft.

The processing electronics coupled to electronic display 300 may provide data regarding the internal and/or external state of the aircraft to electronic display 300. For example, the processing electronics may provide a direction indicator 302 to electronic display 300. Direction indicator 302 may include data regarding the aircraft's heading, course, or bearing. Directions displayed via direction indicator 302 may be relative to a reference direction, such as magnetic north. For example, the aircraft's current heading may be 253° from magnetic north, as shown in FIG. 3. Similarly, line 306 and indicator 304 on electronic display 300 may indicate the current pitch and roll of the aircraft. Line 306 may also conform to the horizon (e.g., line 306 may overlay the precise location of the horizon). The processing electronics may also provide data regarding the aircraft's speed to electronic display 300 via air speed indicator 308 (e.g., a vertical speed, a ground speed, a speed error, etc.) and altitude to electronic display 300 via altitude tape 310 (e.g., a measured barometric altitude, a digital radio altitude, etc.). Other exemplary data that may be provided to electronic display 300 include wind data (e.g., wind speed and wind direction), flight path data, navigational data (e.g., landmarks, etc.), and other data regarding the aircraft and its surroundings. In some embodiments, the processing electronics may provide warnings or alerts to electronic display 300. For example, a TCAS or TAWS may provide an alert to electronic display 300 regarding potentially hazardous traffic or terrain.

The display data provided to electronic display 300 may include indicia to alert a pilot to the location of a nearby airport or runway. As shown, a nearby airport may be highlighted on electronic display 300 via an airport dome 326 or other graphic that highlights the location of an airport. Airport dome 326 may be colored, in some cases, based on the type of the airport (e.g., the dome for an origin airport may be cyan, the dome for a destination airport may be magenta, the dome for an alternate airport may be white, etc.). The airport may be detected in any number of ways, such as by comparing the location of the aircraft to a stored terrain database, in response to receiving a communication from the airport or another land-based communication system, using image recognition on a video feed from an on-board camera, or the like. Similar to airport dome 326, a nearby runway is displayed with highlighting 324 on electronic display 300. In some cases, the coloration of airport dome 326 and/or highlighting 324 are varied on electronic display 300 to signify different ranges between the aircraft and the airport or runway, respectively. For example, the opacity and translucency of airport dome 326 and/or highlighting 324 may be varied based on their distance to the aircraft (e.g., airport dome 326 may have fully opaque highlighting at longer distances and becomes translucent with a highlighted "arc" at shorter distances).

In one embodiment, a runway centerline 312 is provided to electronic display 300 by the processing electronics. Runway centerline 312 may be displayed such that it extends from a nearby runway in a direction perpendicular to an end of the runway (e.g., the end of the runway corresponding to the landing threshold). In some embodiments, runway centerline 312 includes various indicia to signify the distance between a point on or near runway centerline 312 to the runway. Runway centerline 312 may include any number of hash marks, such as hash marks 314-322, which signify different distances to the runway along runway centerline 312. For example, hash marks 314-322 may correspond to the 10 NM, 5 NM, 3 NM, 2 NM, and 1 NM marks, respectively. The overall distance represented by runway centerline 312 (e.g., 10 NM as shown) may be varied in other embodiments. Also, the intervals represented by hash marks 314-322 can be varied in other embodiments to represent different distance intervals than those shown in FIG. 3. In further embodiments, text or numerical indicators are shown on electronic display 300 in conjunction with runway centerline 312. As shown, indicators 328-332 are presented on display 300 to signify the 10 NM, 5 NM, and 3 NM marks along runway centerline 312, respectively. In some cases, indicators 328-332 are presented on display 300 such that they are always facing display 300, regardless of the orientation of runway centerline 312. The font of indicators 328-332 may, in one example, match the font used on the runway itself. Indicators 328-332 can also include other graphical effect to distinguish indicators 328-332 from other symbology used on display 300. For example, indicators 328-332 can include numerical distances contained within shapes (e.g., "shield symbols" or other shapes) that differ from other symbols used on display 300. Similarly, indicators 328-332 may not halo text and may be colored white or another color that provides a contrast with other display data on electronic display 300. In further embodiments, other visual formats may be used for indicators 328-332 to distinguish indicators 328-332 from other symbology used on display 300 (e.g., by using different shapes, colors, fonts, patterns, or the like).

The display of runway centerline 312, hash marks 314-322, and/or indicators 328-332 on electronic display 300 can be based on the relative distance between the aircraft and the airport or runway. In one embodiment, runway centerline 312 is displayed when the aircraft is within a specified threshold distance to the airport. For example, runway centerline 312 may be displayed as part of a synthetic vision system when the aircraft is within 30 NM of the airport. Indicators 328-332 may also fade away on electronic display 300 as the aircraft approaches the airport, in one embodiment.

Runway centerline 312 generally allows a pilot to quickly identify both the presence of a runway as well as the trajectory needed to land the aircraft on the runway. Hash marks 314-322 and indicators 328-332 also allow the pilot to quickly identify the distance to the runway along centerline 312. As a result, the pilot's situational awareness is enhanced regardless of weather or nighttime conditions.

Figure 4A:
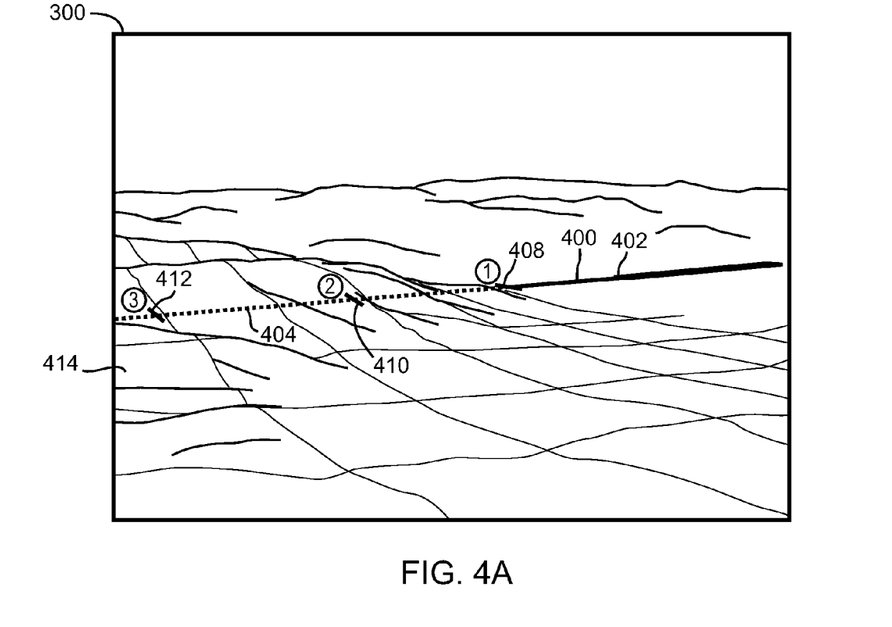
FIG. 4A is an illustration of an electronic display displaying a runway centerline that extends through terrain, according to an exemplary embodiment.
Figure 4B:
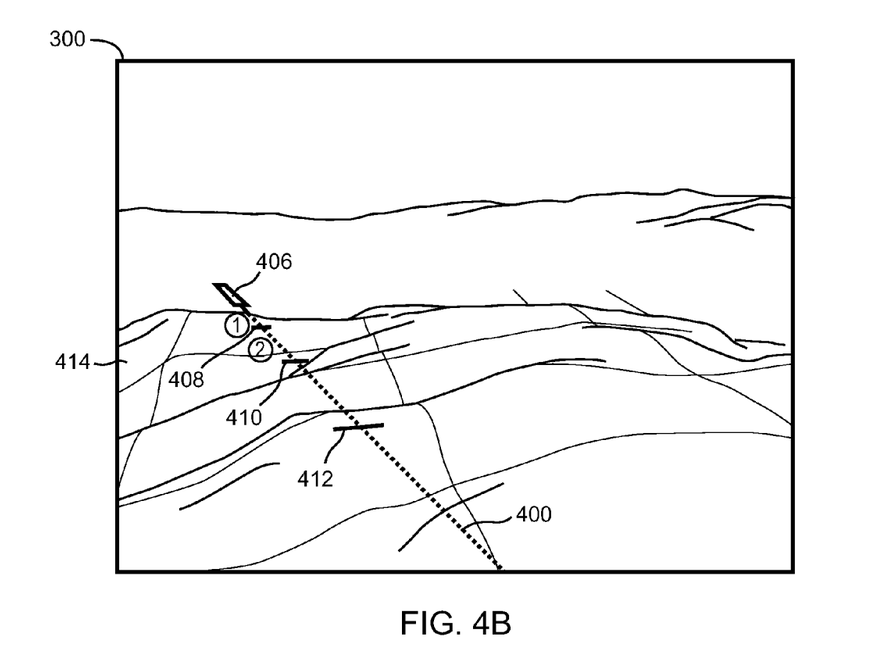
FIG. 4B is a schematic perspective view drawing of the runway centerline of FIG. 4A shown from a different location and heading, according to an exemplary embodiment.

Referring now to FIGS. 4A-B, illustrations are shown of electronic display 300 showing a runway centerline 400 extending through terrain 414. In FIG. 4B, the runway 406 is within the line of sight of the nose of the aircraft (e.g., runway centerline 400 is nearly parallel to the heading of the aircraft). In FIG. 4A, runway centerline 400 is shown from another perspective that corresponds to a different location and heading of the aircraft than in FIG. 4B (e.g., runway centerline 400 is nearly perpendicular to the heading of the aircraft). If the aircraft is within a threshold range to runway 406, runway centerline 400 may still be displayed on electronic display 300 regardless of whether runway 406 is within the presented line of sight, as shown in FIG. 4A. For illustrative purposes only, FIGS. 4A-B depict only runway centerline 400 and its corresponding distance indicators. For example, runway centerline 400 is shown with indicia 408-412 (e.g., hash marks, numerical indicators, etc.) to signify the distances to runway 406 from points along runway centerline 400. Additional information may also be displayed in conjunction with runway centerline 400, such as the additional indicia depicted in FIG. 3 (e.g., an airport indicator, indicators for the direction, speed, altitude, pitch, or roll of the aircraft, or other indicators that provide information regarding the internal or external conditions of the aircraft).

Runway centerline 400 is presented on electronic display 300 in the same geometric plane as runway 406 or at an angle therefrom. For example, runway centerline 400 may extend from runway 406 at an angle of 0.5°, 0.2°, or at any other angle relative to the geometric plane of runway 406. In some cases, the extension of runway centerline 400 may intersect with terrain depicted on display 300, such as terrain 414.

According to various embodiments, the processing electronics providing the display data to display 300 are configured to represent runway centerline 400 as extending through present terrain, such as terrain 414. In one embodiment, runway centerline 400 is depicted as a solid line in areas in which it does not intersect any terrain and as a dashed or dotted line in areas in which it intersects terrain. For example, runway centerline 400 may be presented as a solid line in area 402 to represent that centerline 400 does not intersect any terrain in that region. Similarly, runway centerline 400 may be represented as a dashed or dotted line in area 404 to represent that runway centerline 400 intersects terrain 414 in area 404. Other visual effects are used in further embodiments to distinguish between areas in which runway centerline 400 intersects terrain and areas in which runway centerline does not (e.g., using differing colorations for centerline 400, using a solid line to depict an intersection and a dashed or dotted line in areas where there is no intersection, etc.). In one embodiment, indicia 408-412 may be presented normally regardless of whether or not the distance indicator corresponds to a location on centerline 400 that intersects terrain (e.g., a hash mark may appear as a solid line, a numerical indicator may still be presented, etc.).

In one embodiment, the processing electronics providing display data to display 300 renders runway centerline 400 as two separate lines: a solid line and a dashed or dotted line that overlaps the solid line. A 3D engine executed by the processing electronics may assign a depth value to each pixel of the display data. Next, the engine may turn on a depth buffer for the generated solid line and leave the depth buffer off for the dashed or dotted line. If any terrain intersects a portion of the solid line (e.g., the solid line is farther from the perspective of the aircraft than a surface of the terrain), the solid line will not appear in that area. However, the dashed or dotted line will still be displayed in this area if its corresponding depth buffer is turned off (e.g., the terrain and the dashed or dotted line are rendered together).

Figure 5:
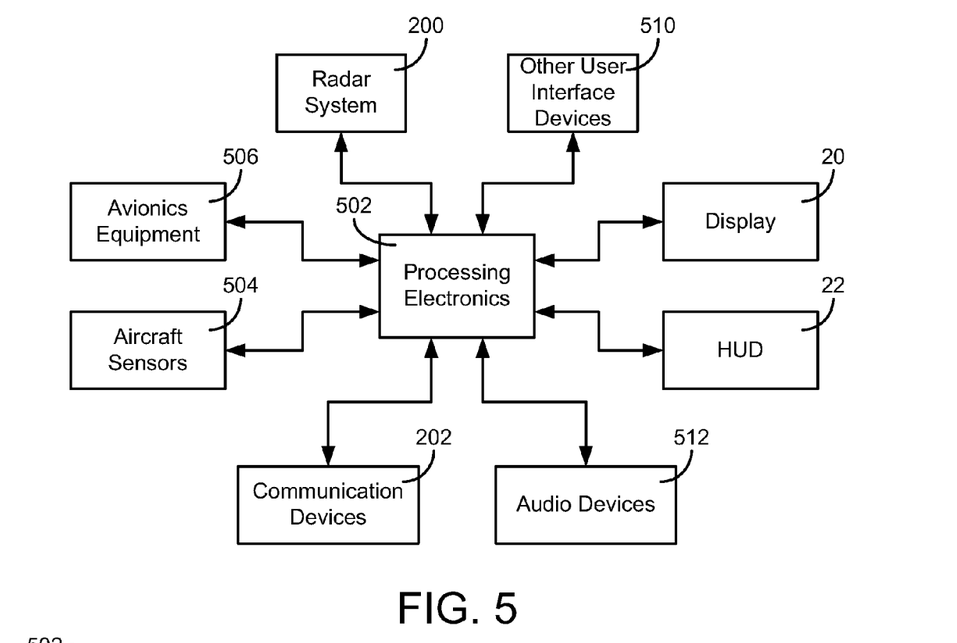
FIG. 5 is a general schematic block diagram of an aircraft's electronic systems, according to an exemplary embodiment.

Referring now to FIG. 5, a general schematic block diagram of an aircraft's electronic systems is shown, according to one embodiment. Processing electronics 502 may include one or more circuits in communication and configured to process received data and to output data based on the processed data. Processing electronics 502 may receive data from, or provide data to, any number of the aircraft's electronic devices.

Processing electronics 502 may be in communication with onboard systems configured to generate data regarding the aircraft and its surroundings. In some cases, processing electronics 502 may be in communication with radar system 200 shown in FIG. 2. Radar system 200 may be installed on the aircraft (e.g., in nose 100 of the aircraft or another location) and may be used by the various detection systems of the aircraft to detect hazardous conditions. For example, radar system 200 may be used by a weather detection system to detect the presence of weather, a windshear condition, by a terrain detection system to detect the presence of terrain, by a collision detection system to detect another aircraft, or by other radar detection systems of the aircraft. Radar system 200 may include a radar antenna connected to circuitry configured to control the direction in which the radar antenna is pointing. Radar system 200 may also include circuitry to transmit a radar beam and to receive radar returns.

Processing electronics 502 may also be in communication with the communication devices 202 shown in FIG. 2. Communication devices 202 may be configured to receive data regarding another aircraft from an external source, such as a ground-based communications system (e.g., air traffic control, etc.), a satellite-based communications system, or from the other aircraft itself. In one embodiment, processing electronics 502 may also transmit data via communication devices 202, such as a request for data regarding nearby aircraft. Processing electronics 502 may also communicate data regarding the aircraft (e.g., the aircraft's current state, flight plan, etc.) to an external system via communication devices 202. Communications devices 202 may include electronics configured to communicate audio and/or video between the aircraft and an external system. In one embodiment, communications devices 202 may include a TCAS receiver or transceiver configured to receive data from other aircraft regarding their range, altitude, and bearing. Data from the TCAS receiver can be used to compute whether other aircraft are in the field of view of HUD 22 in one embodiment.

Processing electronics 502 are shown in communication with aircraft sensors 504. In general, sensors 504 may be any number of sensors that measure aircraft parameters related to the state of the aircraft. For example, sensors 504 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), a camera (e.g., an infrared camera, a microwave camera, etc.), or any other aircraft-mounted sensors that may be used to provide data to processing electronics 502. It should be appreciated that sensors 504 (or any other component shown connected to processing electronics 502) may be indirectly or directly connected to the processing electronics 502. For example, processing electronics 502 may receive a temperature reading directly from a temperature sensor and a throttle position indirectly from a position sensor via an engine controller.

Processing electronics 502 are further shown in communication with avionics equipment 506. In general, avionics equipment 506 may include other electronic control systems in the aircraft. For example, avionics equipment 506 may include a flight management system, a navigation system, a backup navigation system, or another aircraft system configured to provide inputs to processing electronics 502. For example, avionics equipment 506 may include the landing gear system of the aircraft and provide information such as whether or not the landing gear is deployed, a weight on wheels determination, or other parameters to processing electronics 502. In another example, avionics equipment 506 may provide controls inputs, such as a desired throttle or power level to processing electronics 502.

Processing electronics 502 are additionally shown in communication with display 20, HUD 22, audio devices 512, and other user interface devices 510 (e.g., an electronic device that receives input from a user or conveys information to a user). For example, processing electronics 502 may provide information about detected weather or other radar-related information to display 20. In some cases, processing electronics 502 may also receive input from display 20, HUD 22, audio devices 512, or other user interface devices 510. For example, processing electronics 502 may receive a request for a different radar view or an updated trajectory via display 20 or a dial in other user interface devices 510. Processing electronics 502 may also generate a partially or fully synthetic depiction of the exterior of the aircraft using data from radar system 200, communication devices 502, aircraft sensors 504. For example, processing electronics 502 may generate a 3D rendering of the surroundings of the aircraft and provide the generated rendering to HUD 22 or display 20.

Figure 6:
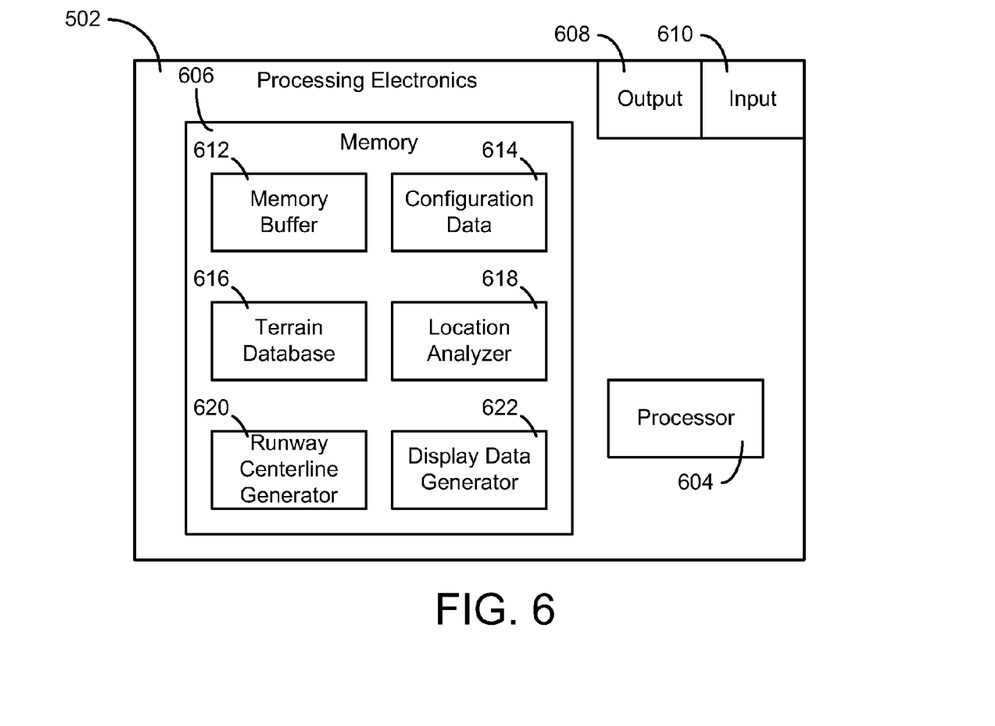
FIG. 6 is a general schematic block diagram of the processing electronics of FIG. 5, according to an exemplary embodiment.

Referring now to FIG. 6, a detailed block diagram of processing electronics 502 of FIG. 5 is shown, according to an exemplary embodiment. Processing electronics 502 includes a memory 606 and processor 604. Processor 604 may be, or may include, one or more microprocessors, an application specific integrated circuit (ASIC), a circuit containing one or more processing components, a group of distributed processing components, circuitry for supporting a microprocessor, or other hardware configured for processing. According to an exemplary embodiment, processor 604 is configured to execute computer code stored in memory 606 to complete and facilitate the activities described herein. Memory 606 can be any volatile or non-volatile computer-readable storage medium capable of storing data or computer code relating to the activities described herein. For example, memory 606 is shown to include modules 618-622 which are computer code modules (e.g., executable code, object code, source code, script code, machine code, etc.) configured for execution by processor 604. When executed by processor 604, processing electronics 502 is configured to complete the activities described herein.

Processing electronics includes hardware circuitry for supporting the execution of the computer code of modules 618-622. For example, processing electronics 502 includes hardware interfaces (e.g., output 608) for communicating control signals (e.g., analog or digital signals) from processing electronics 502 to avionics equipment 506 and to provide signals to other devices such as display 20, HUD 22, audio devices 512, and other user interface devices 510. Processing electronics 502 may also include an input 610 for receiving, for example, data from user interface devices (e.g., display 20, etc.) or other systems (e.g., aircraft sensors 504, avionics equipment 506, communication devices 202, etc.).

Memory 606 includes a memory buffer 612 for receiving and storing radar return data from radar system 200, sensor data from aircraft sensors 504, operational data from avionics equipment 506, and/or data received via communications devices 202. For example, memory buffer 612 may include data regarding the aircraft's altitude, speed, heading, bearing, and other characteristics. Memory buffer 612 may also include data regarding the aircraft's external conditions, such as detected weather, wind data, terrain data, etc. In some embodiments, the data stored in memory buffer 612 may include data regarding another aircraft. For example, memory buffer 612 may include data regarding the other aircraft's location (e.g., data received or calculated regarding the other aircraft's latitude, longitude, altitude, etc.).

Memory 606 further includes configuration data 614. Configuration data 614 may include various parameters used to control which display data is provided to HUD 22, flight displays 20, and to the other user interface devices of the aircraft. In one embodiment, configuration data 614 includes a parameter that controls whether HUD 22 is in a partially transparent state, an enhanced vision state, or a synthetic vision state. Configuration data 614 may also include one or more parameters that control when data regarding a nearby airport is presented to HUD 22 and/or to one or flight displays 20.

Memory 606 includes a terrain database 616 configured to store data regarding the geolocation of natural and man-made terrain. A geolocation may be a set of latitude and longitude coordinates or any other form of values that uniquely define a location along the surface of the Earth. Terrain database 616 may include data regarding the geolocations of naturally occurring terrain, such as oceans, mountains, hills, and the like. Terrain database 616 may also include the geolocations of man-made objects and other terrain, such as airports, buildings, towers, etc. In one embodiment, terrain database 616 also stores data regarding the height or shape of terrain. For example, terrain database 616 may include topographical data for the terrain. In the case of airports stored in terrain database 616, terrain database 616 may also store data regarding the location and layout of the runways of the airport, the terminal of the airport, and the location of any other building or structure associated with the airport.

Memory 606 includes a location analyzer 618 configured to determine the location of the aircraft. Location analyzer 618 uses sensor data received via input 610 to determine location values for the aircraft, such as the geolocation of the aircraft and the altitude of the aircraft. For example, location analyzer 618 may use received GPS data and data from a radio altimeter to determine the geolocation and altitude of the aircraft. Location analyzer 618 may also analyze the received sensor data to determine movement-related parameters, such as the direction, heading, course, pitch, or roll of the aircraft.

Location analyzer 618 is configured to determine the location of airports, terrain, weather, other aircraft, and the like relative to the location of the aircraft. In one embodiment, location analyzer 618 compares the determined location of the aircraft to terrain database 616, to identify terrain near the aircraft. For example, location analyzer 618 may use the geolocation, altitude, heading, etc. of the aircraft to retrieve data from terrain database 616 regarding terrain near the aircraft. In one embodiment, location analyzer 618 uses radar returns or other sensor data (e.g., a video feed from a camera) to supplement the data retrieved from terrain database 616. For example, location analyzer 618 may compare terrain data from terrain database 616 to the radar or sensor data to validate the retrieved terrain data (e.g., to detect changes between terrain database 616 and the actual terrain). In one embodiment, location analyzer 618 is part of a TAWS that generates an alert if the aircraft is approaching terrain.

Memory 606 includes a runway centerline generator 620 configured to determine a runway centerline for a nearby runway identified by location analyzer 618. The runway centerline is calculated in the same plane as the runway or at an angle extending from the runway. For example, the runway centerline may be calculated as extending from the landing threshold of the runway out to a predetermined distance (e.g., the runway centerline may extend out from the runway to 10 NM at an angle of 0.5° from the geometric plane of the runway). In one embodiment, runway centerline generator 620 is configured to generate a runway centerline based on a threshold distance between the aircraft and the runway. For example, runway centerline generator 620 may only generate a runway centerline for a runway that is within 30 NM from the aircraft, as determined by location analyzer 618. Runway centerline generator 620 may generate a runway centerline out to any distance extending from the runway (e.g., 15 NM, 10 NM, etc.). In some embodiments, runway centerline generator 620 also generates distance markers along the runway centerline that denote the distance between a point on the centerline and the runway. The distance markers may be at predetermined intervals or may be at variable intervals based on a parameter set in configuration data 614. For example, runway centerline generator 620 may generate hash marks along the generated centerline and/or symbolic indicators that represent the distance from a point on the centerline to the runway.

Memory 606 includes a display data generator 622 configured to generate and provide display data to one or more displays (e.g., HUD 22, a flight display 20, etc.) via output 608. Display data generator 622 may use location data generated by location analyzer 618 and terrain data from terrain database 616 to generate a fully virtual or partially virtual representation of the surroundings of the aircraft. Display data generator 622 can also generate display data that includes indicia regarding the state of the aircraft, such as the altitude, speed, heading, etc. of the aircraft. In various embodiments, the display data may be a screen of a synthetic vision system, an overlay for a transparent HUD (e.g., an augmented reality display), or an overlay for a video feed (e.g., from an infrared or other camera).

Display data generator 622 can use a 3D graphics engine to generate display data. The graphics engine operates by rendering three dimensional shapes based on data from terrain database 616, location analyzer 618, and runway centerline generator 620. The graphics engine may overlay shapes based on their relative position to the aircraft and assign depth values to the shapes. Display data generator 622, in some cases, applies a depth filter that selects the shape having the lowest depth value in presentation on a display in a particular screen area or pixel. For example, display data generator 622 may render a mountain located in front of the aircraft, but not a cellular tower occluded by the mountain (e.g., the cellular tower is located on the other side of the mountain). In one embodiment, display data generator 622 renders a runway centerline from runway centerline generator 620 as passing through any terrain or other objects that intersect the centerline. For example, display data generator 622 may receive duplicate centerlines from runway centerline generator 620, one centerline having a solid line and another having a dotted or dashed line. In such a case, display data generator 622 may apply a depth filter only to the solid centerline, thereby producing the effect of the centerline passing through any intersecting terrain.

Figure 7A:
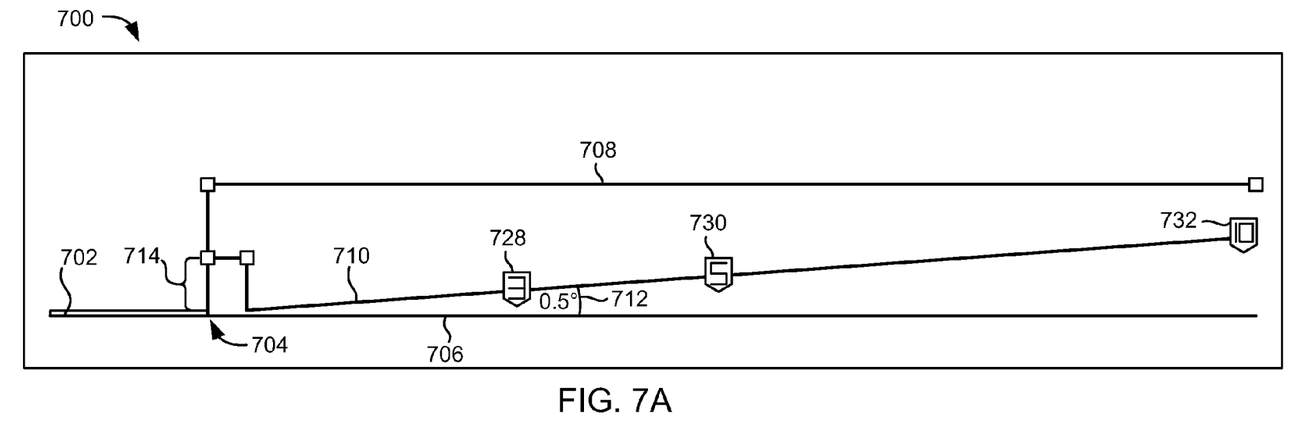
FIG. 7A is a schematic profile view drawing of a computed runway centerline, according to an exemplary embodiment.
Figure 7B:
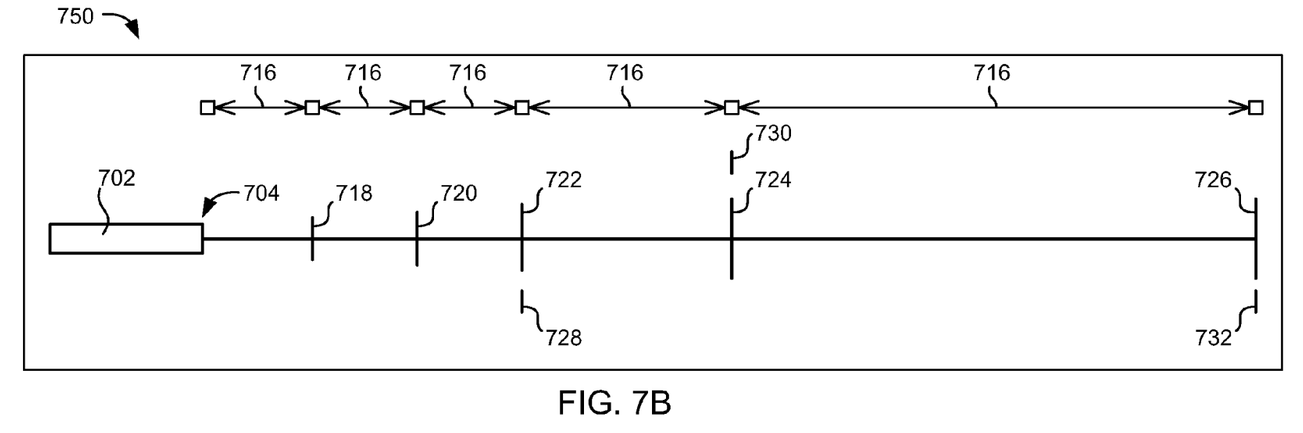
FIG. 7B is a schematic top view drawing of the runway centerline of FIG. 7A, according to an exemplary embodiment.

Referring now to FIGS. 7A-7B, illustrations are shown of a computed runway centerline, according to exemplary embodiments. FIG. 7A is an illustration 700 of a profile view of the computed runway centerline 710. FIG. 7B is an illustration 750 of the runway centerline 710 of FIG. 7A shown from a top view. Runway centerline 710 may be computed by processing electronics, such as by runway centerline generator 620 of processing electronics 502 shown in FIG. 6. The calculated runway centerline 710 and any associated data (e.g., distance indicators) may then be used by the processing electronics to generate display data and provided to an electronic display.

As shown, a runway 702 may be detected by the processing electronics based on the location of the aircraft. In one embodiment, runway centerline 710 is only determined by the processing electronics if the distance between the geolocation of runway 702 and that of the aircraft is within a threshold distance. For example, runway centerline 710 may only be determined if the aircraft is within a particular range of the geolocation of the runway. In one embodiment, the processing electronics may also be configured to use an altitude threshold to control whether runway centerline 710 is generated. For example, runway centerline 710 may only be rendered if the altitude of the aircraft is above threshold 714 (e.g., the aircraft is at an altitude of 1,200 feet or above).

Runway centerline 710 can be generated from a landing threshold 704 or from any other point on runway 702. Landing threshold 704 is an edge of runway 702 that corresponds to the earliest point at which an aircraft can land. In other embodiments, runway centerline 710 is generated from a location more central to runway 702 or from the end of runway 702 that is opposite that of landing threshold 704. Runway centerline 710 may extend from a location that is at or near the bisection point of runway 702 out to a predefined distance 708 (e.g., 10 NM. Runway centerline 710 may also extend from runway 702 at an angle 712 relative to the horizontal plane 706 that contains runway 702. For example, angle 712 may be 0.5° from plane 706.

Distance indicators may be determined in conjunction with runway centerline 710 according to predefined intervals 716. For example, a 10 NM long centerline may be subdivided to denote the 1 NM, 2 NM, 3 NM, 5 NM, and 10 NM distances to runway 702 along centerline 710. As shown in FIG. 7B, hash marks 718-726 may be generated on runway centerline 710 at intervals 716. In one embodiment, the length of hash marks 718-726 may be varied by the processing electronics to further denote the respective distances to runway 702. For example, hash mark 718 located 1 NM from runway 702 may have a length that corresponds to 150 meters, hash mark 720 located 2 NM from runway 702 may have a length that corresponds to 200 meters, hash mark 722 located 3 NM from runway 702 may have a length that corresponds to 250 meters, and hash marks 724-726 may have lengths that correspond to 300 meters. In various embodiments, different visual formats for hash marks 724-726 are used than those depicted in FIG. 7B (e.g., different shapes, sizes, colors, etc.).

Symbolic distance indicators 728-732 may also be generated in addition to, or in lieu of, hash marks 718-726. Symbolic distance indicators 728-732 include the numeric distance to runway 702 from various points on runway centerline 710 (e.g., at the 3 NM, 5 NM, and 10 NM marks, respectively). Symbolic distance indicators 728-732 also have shapes and/or colorations that distinguish distance indicators 728-732 from other portions of a display. In one embodiment, symbolic distance indicators 728-732 are generated such that their orientations always face the display screen. Different visual formats may be used for distance indicators 728-732 than those shown, according to various embodiments. For example, distance indicators 728-732 may have different colorations, shapes, sizes, or the like, in other embodiments. In some embodiments, the visual appearance of distance indicators 728-732 may be varied based on the distance between the aircraft and runway 702. For example, distance indicators 728-732 may fade out or otherwise disappear on the display as the aircraft approaches runway 702.

Figure 8:
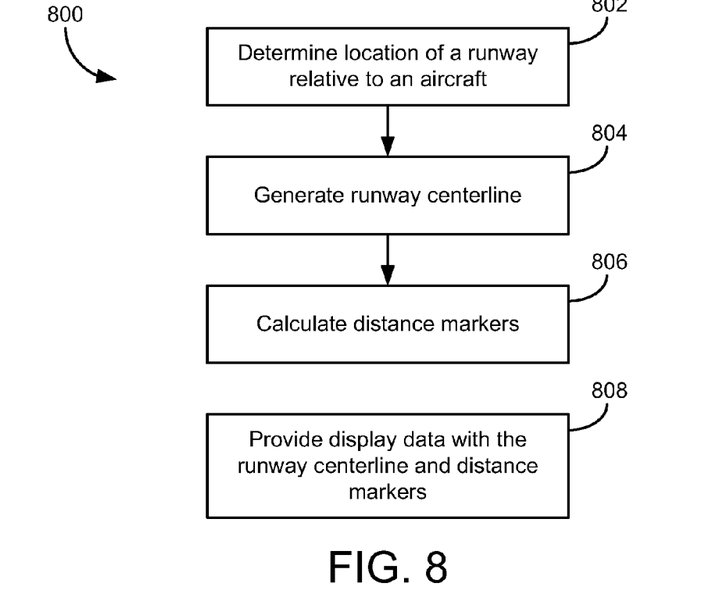
FIG. 8 is a flow chart of a process for displaying an extended runway centerline on an electronic display, according to an exemplary embodiment.

Referring now to FIG. 8, a flow chart of a process 800 for displaying an extended runway centerline on an electronic display, according to an exemplary embodiment. Process 800 is implemented by processing electronics that execute stored machine instructions, such as the processing electronics 502 shown in FIGS. 5-6. The processing electronics may be centralized (e.g., within an aircraft) or may be distributed. In other words, certain steps of processes 800 can be performed by processing electronics internal or external to the aircraft.

Process 800 includes determining the location of a runway relative to an aircraft (step 802). The relative location of the runway may be determined in any number of ways using data from any number of different sources. In one embodiment, the location of the runway is self-reported to the aircraft or reported from a nearby ground communication station. For example, a transmitter or transceiver located at the airport or near the airport may communicate a location and/or distance value to processing electronics on board the aircraft. In another embodiment, the processing electronics determine the relative location of the runway based on a comparison between the location of the aircraft and a location of the runway stored in a terrain database. For example, the geolocation of the aircraft may be determined via a GPS or other satellite-based signal, via triangulation, or another location determination mechanism. Using the geolocation of the aircraft, data regarding nearby locations can be retrieved from the terrain database. In a further embodiment, the location of the runway is determined by the processing electronics relative to both the location of the aircraft and a direction of travel of the aircraft (e.g., heading, course, etc.). Sensor data can be used by the processing electronics to determine the direction of travel of the aircraft. In yet another embodiment, the location of the runway relative to the aircraft includes an altitude component that represents the difference in altitude between the aircraft and the runway.

Process 800 includes generating a runway centerline (step 804). In general, a runway centerline is a line segment that extends along, or is parallel to, a line that bisects the runway. The end of the line segment closest to the runway may be located on the runway, on an edge of the runway (e.g., at a landing threshold), or at a predetermined distance away from the perimeter of the runway. The end of the line segment farther away from the runway may be at any predefined distance, such as 10 NM from the runway. In one embodiment, the runway centerline is generated in the same plane as the runway. In another embodiment, the runway centerline may extend at an angle away from the plane of the runway. For example, the runway centerline may gradually increase at an angle of 0.5° or 0.2° away from the geometric plane of the runway. The runway centerline can also be generated through any present terrain or other obstacles. In such cases, the runway centerline may be displayed differently between areas in which no intersection occurs and areas in which the centerline intersects with terrain or other obstacles.

According to various embodiments, one or more thresholds are used to control when and how a runway centerline is generated. In one embodiment, the runway centerline is only generated when the aircraft is within a predefined distance threshold to the runway. For example, the runway centerline may only be generated when the aircraft is within 30 NM of the runway. In another embodiment, the runway centerline is only generated when the aircraft is above an altitude threshold relative to the runway. For example, the runway centerline may only be generated when the aircraft is at an altitude above 1,000 ft relative to the runway. In yet another embodiment, a direction of movement of the aircraft is used to control when and how the runway centerline is generated. For example, the runway centerline may not be generated if the aircraft is moving away from the runway.

Process 800 includes calculating distance markers for the runway centerline (step 806). Distance markers may be calculated at any predefined interval or set of intervals relative to the runway. For example, distance markers may be calculated 1 NM, 2 NM, 3 NM, 5 NM, etc. from the runway. In one embodiment, the intervals are determined relative to the same plane of the runway (e.g., the ground) and correspond to points along the runway centerline. Distance markers can be represented graphically in any number of different ways (e.g., as hash marks along the runway centerline, using text or numerical symbols, etc.). In some embodiments, distance markers are generated such that they face a display screen regardless of the relative locations and orientations of the aircraft and the runway centerline. Distance markers can be excluded from generation or faded out, based on the aircraft's location relative to the runway. For example, a 10 NM distance marker may not be generated if the aircraft is within 4 NM of the runway. In another example, a distance marker may fade away as the aircraft approaches the corresponding distance to the runway.

Process 800 includes providing display data with the runway centerline and distance markers (step 808). The display data may be provided to a HUD, a HDD, or any other form of electronic display. In one embodiment, the display data includes a fully virtual rendering of the exterior of the aircraft. A virtual rendering can be generated using retrieved terrain data from a terrain database. Radar returns and sensor data can also be used to supplement or validate the stored terrain data. In cases in which a fully virtual rendering is presented to the display, the runway centerline and distance markers are presented in conjunction with a virtual rendering of the runway. In another embodiment, the display data includes graphics that appear as an overlay. The overlay can be displayed alone (e.g., on a transparent HUD) or in conjunction with other display data, such as a video feed from a camera on the aircraft (e.g., an IR camera).

The display data provided to an electronic display can also include additional information regarding the internal or external conditions of the aircraft. In some cases, the display data can include data regarding another aircraft or weather. The display data can also include sensed or calculated values regarding the aircraft, such as the altitude, speed, heading, course, pitch, roll, etc. of the aircraft. In various embodiments, the display data includes indicia that highlight the location of certain external conditions. For example, an airport dome or runway highlighting can be displayed, to alert the pilot to the location of the airport or runway (e.g., either the actual or virtual airport or runway). The display data can also be based in part on the distance to a runway or airport from the aircraft, the altitude of the aircraft, the heading of the aircraft, or any other measure. For example, the coloration of an airport dome or runway highlighting can be altered based on the location of the aircraft (e.g., an airport dome may become transparent with only an arc highlighted, when the aircraft is within a certain distance to the aircraft).

Figure 9:
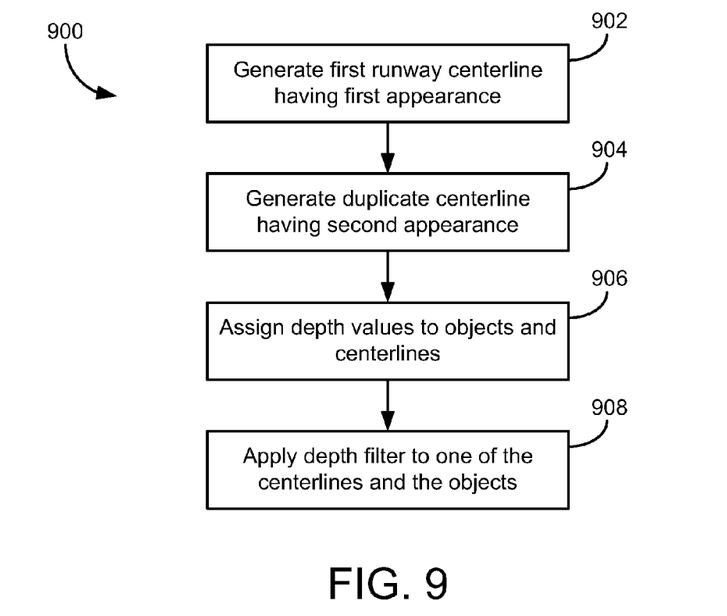
FIG. 9 is a flow chart of a process for displaying an extended runway through objects, according to an exemplary embodiment.

Referring now to FIG. 9, a flow chart of a process 900 for displaying an extended runway through objects is shown, according to an exemplary embodiment. Process 900 is implemented by processing electronics that execute stored machine instructions, such as the processing electronics 502 shown in FIGS. 5-6. The processing electronics can also be centralized (e.g., within an aircraft) or may be distributed, in various embodiments. In one embodiment, process 900 is implemented in conjunction with process 800. Process 900 generally allows a runway centerline to be generated and displayed through any present obstacles, such as terrain, other aircraft, and the like.

Process 900 includes generating a first runway centerline having a first appearance (step 902). The runway centerline may be generated in a similar manner as step 804 of process 800 or in any other way. Any number of visual effects can be used to control the appearance of the runway centerline. Exemplary visual effects include, but are not limited to, those effects that control the coloration of the centerline, the width of the centerline, whether the centerline is solid, and the like. For example, a first runway centerline may be generated as a solid line segment having a magenta coloration.

Process 900 includes generating a second runway centerline having a second appearance (step 904). In some embodiments, the first and second runway centerlines are identical in terms of endpoints and lengths. For example, the first and second runway centerlines may originate at the same landing threshold of a runway and extend 10 NM from the runway at a 0.2° angle in the same direction. Similar to the first runway centerline, visual effects can be used to control the appearance of the second runway centerline such that the two centerlines appear differently. For example, the second runway centerline may be generated as a dotted or dashed line segment, if the first runway centerline is a solid line segment.

Process 900 includes assigning depth values to the runway centerlines and to other objects (step 906). In one embodiment, the objects correspond to 3D representations of terrain and other objects. The representations may be retrieved from a database (e.g., a terrain database or the like), rendered using radar or other sensor data, or appear as part of a video stream. In another embodiment, the objects are actual objects that are visible by the naked eye through a transparent HUD. Regardless of how the terrain and other objects are to appear on a display screen, calculated distances between the centerlines, terrain, and other objects to the aircraft are used to assign the depth values. For example, a surface of a mountain may be 1 NM from the aircraft while a runway centerline running through the mountain may be 1.1 NM from the aircraft.

Process 900 includes applying depth filters to one of the centerlines and to the objects (step 908). In general, a depth filter is configured to select only the centerline or other object located in a particular screen area (e.g., a pixel or collection of pixels) for presentation on the display. Using the example of a mountain surface located 1 NM from the aircraft and a runway centerline running through the mountain at 1.1 NM from the aircraft, a depth filter applied to both the surface of the mountain and to the centerline will result in only the mountain surface being displayed. In one embodiment, a depth filter is applied only to one of the two centerlines. In this situation, both the surface of the mountain and the unfiltered runway centerline will be displayed. As a result, the two centerlines appear as a single centerline on the display, with different visual effects applied to areas that intersect terrain or other objects and to areas that do not intersect terrain or other objects. For example, the single centerline may appear to change visual effects when passing through terrain or other objects, as shown in FIGS. 4A-4B.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of depicting an extended runway centerline to an electronic display, the method comprising:
   determining, by processing electronics, a location of a runway relative to an aircraft;
   generating the extended runway centerline based in part on the location of the runway relative to the aircraft, the extended runway centerline extending from a start point on the runway to an endpoint located at a predefined distance from the start point, the end point not being on the runway; and
   calculating one or more distance markers for the runway centerline, each distance marker corresponding to the distance from the start point to a point on the runway centerline; and
   providing display data to an electronic display, the display data being configured to cause the electronic display to show a depiction of the extended runway wherein the depiction of the extended runway centerline is provided in a first depiction format at first sections of the extended runway where the depiction of the extended runway centerline is behind an obstacle or terrain feature according to a depth filter and in a second depiction format at second sections of the extended runway where the depiction of the extended runway centerline is in front of the obstacle or terrain feature according to the depth filter.

2. The method of claim 1, further comprising:
   comparing an altitude of the aircraft to an altitude threshold, wherein the extended runway centerline is generated based in part on whether the altitude of the aircraft is above the altitude threshold.

3. The method of claim 1, further comprising:
   comparing a distance between the aircraft and the runway to a distance threshold, wherein the extended runway centerline is generated based in part on whether the distance between the aircraft and the runway is below the distance threshold.

4. The method of claim 1, further comprising providing a distance marker comprising at least one of a hash mark along the first or second depiction of the extended runway centerline.

5. The method of claim 1, further comprising:
   retrieving terrain or obstacle data from a terrain or obstacle database based on a location of the aircraft;
   generating a graphical representation of the terrain or obstacle; and
   providing the graphical representation of the terrain or obstacle as part of the display data.

6. The method of claim 5, wherein the display data is configured to cause the display to show a screen of a synthetic vision system.

7. The method of claim 5, wherein the display data is configured to depict the extended runway centerline with a first line extending through or behind the terrain or obstacle and a second line extending over the terrain or obstacle.

8. A method of providing an extended runway centerline to a display, the method comprising:
   determining, by processing electronics, a location of a runway relative to an aircraft;
   generating a runway centerline based in part on the location of the runway relative to the aircraft, the runway centerline extending from a start point on the runway to an endpoint located at a predefined distance from the start point;
   calculating one or more distance markers for the runway centerline, each distance marker corresponding to the distance from the start point to a point on the runway centerline; and
   providing display data to an electronic display, the display data being configured to cause the electronic display to show the generated runway centerline and one or more distance markers;
   retrieving terrain or obstacle data from a terrain or obstacle database based on a location of the aircraft;
   generating a graphical representation of a terrain or obstacle; and
   providing the graphical representation of the terrain or obstacle as part of the display data, wherein the display data is configured to depict the runway centerline extending through or behind the terrain or obstacle, wherein the runway centerline is depicted as extending through or behind the terrain or obstacle by:
generating a second runway centerline extending from the start point to the endpoint and having a different visual appearance than the runway centerline;
assigning depth values to the terrain data and the second runway centerline, the depth values representing distances from the aircraft to the second runway centerline and terrain; and
generating the display data by applying a depth filter to the second runway centerline and to the terrain.

9. The method of claim 4, wherein the display data is configured to cause the hash mark or symbol to fade out as the aircraft approaches the runway.

10. A system for providing an extended runway centerline comprising an electronic location sensor, an electronic display and processing electronics configured to:
cause the electronic display to provide a visual image of the extended runway centerline based in part on the location of the runway relative to a location of the aircraft as provided by the electronic location sensor, the extended runway centerline extending from a start point on a depiction of the runway to an endpoint located at a predefined distance from the start point, the end point not being on the runway;
wherein the extended runway centerline is comprised of a first portion depicted to extend through a first object or terrain feature and a second portion depicted to extend over a second object or terrain feature.

11. The system of claim 10, wherein the processing electronics are configured to:
compare an altitude of the aircraft to an altitude threshold, wherein the runway centerline is generated based in part on whether the altitude of the aircraft is above the altitude threshold.

12. The system of claim 10, wherein the processing electronics are configured to:
compare a distance between the aircraft and the runway to a distance threshold, wherein the extended runway centerline is generated based in part on whether the distance between the aircraft and the runway is below the distance threshold.

13. The system of claim 10, wherein the processing electronics are configured to provide a distance marker comprises at least one of a hash mark along the extended runway centerline.

14. The system of claim 10, wherein the processing electronics are configured to:
retrieve terrain or obstacle data from a terrain or obstacle database based on the location of the aircraft;
generate a graphical representation of a terrain or obstacle; and
provide the graphical representation of the terrain or obstacle as part of display data for the electronic display.

15. The system of claim 14, wherein the display data is configured to cause the electronic display to show a screen of a synthetic vision system.

16. The system of claim 14, wherein the display data is configured to depict the runway centerline extending through or behind the terrain or object.

17. A system for providing an extended runway centerline to a display comprising processing electronics configured to:
determine a location of a runway relative to an aircraft;
generate a runway centerline based in part on the location of the runway relative to the aircraft, the runway centerline extending from a start point on the runway to an endpoint located at a predefined distance from the start point;
calculate one or more distance markers for the runway centerline, each distance marker corresponding to the distance from the start point to a point on the runway centerline; and
provide display data to an electronic display, the display data being configured to cause the electronic display to show the generated runway centerline and the one or more distance markers;
retrieve terrain or obstacle data from a terrain or obstacle database based on a location of the aircraft;
generate a graphical representation of a terrain or obstacle; and
provide the graphical representation of the terrain or obstacle as part of the display data, wherein the display data is configured to depict the runway centerline extending through or behind the terrain or obstacle, wherein the processing electronics are configured to depict the runway centerline as extending through or behind the terrain or obstacle by:
generating a second runway centerline extending from the start point to the endpoint and having a different visual appearance than the runway centerline;
assigning depth values to the terrain data and the second runway centerline, the depth values representing distances from the aircraft to the runway centerlines and terrain; and
generating the display data by applying a depth filter to the second runway centerline and to the terrain.

18. A computer-readable storage medium having instructions stored therein, the instructions being executable by a processor to cause the processor to perform operations, the operations comprising:
determining, by processing electronics, a location of a runway relative to an aircraft;
generating an extended runway centerline based in part on the location of the runway relative to the aircraft, the extended runway centerline extending from a start point on the runway to an endpoint located at a predefined distance from the start point; and
providing display data to an electronic display, the display data being configured to cause the electronic display to show a depiction of the extended runway centerline, wherein the depiction of the extended runway centerline is depicted in a first format and fashion according to a depth filter indicating that the extended runway centerline intersects an obstacle or terrain feature and according to a second format and fashion according to the depth filter indicating that the runway centerline overlays the obstacle or terrain feature.

19. The computer-readable storage medium of claim 18, wherein the display is a heads-up display.

20. The computer-readable storage medium of claim 18, wherein the depiction further comprise distance markers calculated at one, two, three, five, and ten nautical miles from the start point.

* * * * *